(12) United States Patent
Hampton, Sr.

(10) Patent No.: US 7,669,834 B2
(45) Date of Patent: Mar. 2, 2010

(54) HOSE END LEVER CONTROLLED BALL SPIGOT VALVE

(76) Inventor: Richard C. Hampton, Sr., 1321 Third St., Westmoreland City, PA (US) 15692

( * ) Notice: Subject to any disclaimer, the term of this patent is extended or adjusted under 35 U.S.C. 154(b) by 1077 days.

(21) Appl. No.: 11/229,193

(22) Filed: Sep. 16, 2005

(65) Prior Publication Data

US 2007/0063165 A1    Mar. 22, 2007

(51) Int. Cl.
*F16K 5/06* (2006.01)
(52) U.S. Cl. ............... 251/315.1; 251/304; 251/315.01
(58) Field of Classification Search ............. 251/315.1, 251/304, 31.01, 315.11, 315.12, 315.13; 137/270, 801
See application file for complete search history.

(56) References Cited

U.S. PATENT DOCUMENTS

| | | | | |
|---|---|---|---|---|
| 1,364,059 A * | 12/1920 | Jones | ......................... | 251/304 |
| 1,498,367 A * | 6/1924 | Ferguson | ............... | 137/625.24 |
| 1,677,242 A * | 7/1928 | Larrigan | ..................... | 251/310 |
| 1,852,900 A * | 4/1932 | Robinson | ............... | 137/329.04 |
| 1,953,448 A * | 4/1934 | Theate et al. | ................ | 251/86 |
| 2,063,699 A * | 12/1936 | Schellin | ....................... | 251/317 |
| 2,905,197 A * | 9/1959 | Janes | ..................... | 137/625.47 |
| 3,267,956 A * | 8/1966 | Kline | .......................... | 137/360 |
| 3,378,227 A * | 4/1968 | Newell | ........................ | 251/304 |
| 3,448,961 A * | 6/1969 | Enssle | ........................ | 251/288 |
| 3,463,451 A * | 8/1969 | Treadwell | ............... | 251/315.14 |
| 3,498,585 A * | 3/1970 | Kirk et. al. | ............... | 251/315.12 |
| 3,591,137 A * | 7/1971 | Billeter | ........................ | 251/205 |
| 3,677,516 A * | 7/1972 | Hicks | .......................... | 251/174 |
| 3,700,210 A * | 10/1972 | Manoogian | ................. | 251/304 |
| 3,760,836 A * | 9/1973 | Albanese | .................... | 137/360 |
| 4,089,345 A * | 5/1978 | Eberhardt | ................ | 137/596.2 |
| 4,099,543 A * | 7/1978 | Mong et al. | ............ | 137/625.22 |
| 4,499,918 A * | 2/1985 | Jong | .......................... | 137/606 |
| 4,747,427 A * | 5/1988 | Smith et al. | .................. | 137/270 |
| 4,993,453 A * | 2/1991 | McHugh | ..................... | 137/559 |
| 5,246,200 A * | 9/1993 | Barker | ........................ | 251/148 |
| 5,407,177 A * | 4/1995 | Lombardo | ............. | 251/315.14 |
| 5,549,135 A * | 8/1996 | Kawahara | ............... | 137/614.17 |
| 5,632,294 A * | 5/1997 | Benton | ........................... | 137/1 |
| 5,735,307 A * | 4/1998 | Charron | ...................... | 137/270 |
| 6,138,715 A * | 10/2000 | LaLone et al. | ............... | 137/797 |
| 6,267,353 B1 * | 7/2001 | Friedline et al. | ......... | 251/315.1 |
| 6,279,964 B1 * | 8/2001 | Watts | ......................... | 285/179 |
| D481,106 S * | 10/2003 | Pelletz | ........................ | D23/245 |
| 6,813,787 B2 * | 11/2004 | Rosenberg | ..................... | 4/601 |
| 2003/0062497 A1 * | 4/2003 | Paine | ......................... | 251/148 |

* cited by examiner

*Primary Examiner*—John K Fristoe, Jr.
(74) *Attorney, Agent, or Firm*—Carothers & Carothers

(57) ABSTRACT

A hose end lever controlled ball valve spigot incorporating a quarter turn lever actuated ball valve having a valve housing with a 90° inlet which protrudes 180° away from the valve actuating lever so that the lever handle of the valve is exposed in a vertical plane for easy access and operation. An outlet spout is secured to the valve housing at the valve outlet and extends at an approximate angle of 45° from the valve housing in the same direction as the actuating lever.

4 Claims, 2 Drawing Sheets

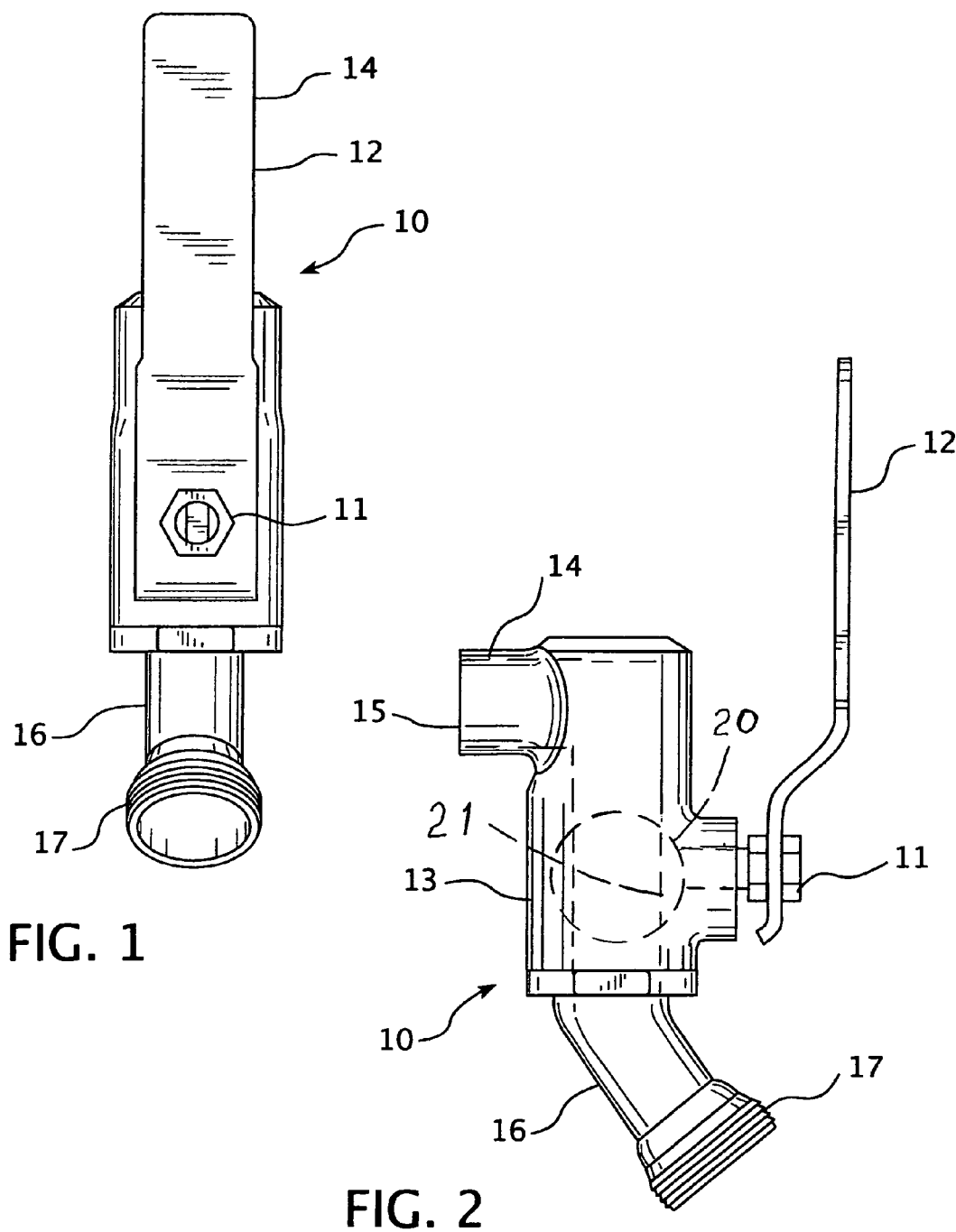

HOSE END LEVER CONTROLLED BALL SPIGOT VALVE

BACKGROUND OF THE INVENTION

The present invention pertains generally to valves and more particularly to hose end spigot valves.

The typical hose end spigot valve presently on the market consists of a right angle spout having a first portion extending horizontally and receiving the valve with the valve handle being positioned on top and then a second portion depending downwardly at 90° with a threaded hose coupling at the bottom distal end of the spout. The spigot valve is a conventional twist or screw type valve with a rubber seal that engages an underlying valve seat and the handle is generally a round handle. This conventional type spigot valve has many shortcomings. First of all, if the valve is not operated frequently they can become very hard or difficult to open and close due to corrosion and they also take a considerable amount of time to twist open and close. In addition, the valve seal washer deteriorates quickly and must be replaced often. In fact, in many situations such valve washers cannot be replaced as either the washer seat deteriorates or the brass screw holding the washer to the valve stem breaks off.

The round handles are also very difficult to grip and manipulate by the physically handicapped who are hindered by arthritis or other defects in the hands, and in addition, operation of the round handles often causes one to hit or engage ones knuckles against close by surfaces or walls.

Also, since the outlet of the conventional spigot depends directly downward, it is very difficult to see the threads and therefore difficult to engage a hose coupling without cross threading. This connection is also hindered by the fact that the thread for the hose connection are positioned much too close to the horizontal portion of the valve body or housing.

Another shortcoming of the prior art spigot is that the spigot outlet depends vertically downward so that when the threadably attached hose is connected to the spigot outlet, and outward stresses are applied to the hose by the operator, the hose end adjacent the spigot coupling is over stressed and weakened with use which causes frequent hose failure at this area.

Accordingly, it is a principal object of the present invention to provide a hose end spigot which is devoid of all these aforementioned disadvantages of the prior art hose end spigot valves.

SUMMARY OF THE INVENTION

The hose end water spigot of the present invention incorporates a lever controlled ball spigot valve which is generally comprised of a quarter turned lever actuated ball valve having a valve body with an inlet and an outlet. The valve housing inlet is provided with a 90° bend for thereby providing a 90° inlet for the valve with an inlet which protrudes 180° away from the lever actuator for the valve. In other words, this arrangement permits the ball valve to be positioned in a vertical portion of the spigot housing with the ball valve lever actuator positioned in a vertical plane on the outward exposed side of the valve for easy access whereby the operator's hands cannot and will not engage any surrounding surfaces, such as rough wall surfaces.

The outlet spout for the spigot of the present invention is secured to the valve body at the valve outlet for thereby providing an outlet for the valve having a threaded male hose coupling on the distal outlet end of the spout. The outlet spout preferably extends at an approximate angle of 45° from the valve housing in the same direction of the ball valve lever actuator. This positions the hose threads where one can easily see them and thereby permits easy threadable coupling of the hose with less chance of cross threading. In addition, the angle of the spout causes less stress on the coupling end of the connected hose when the hose is being pulled by the operator.

The valve housing and 90° inlet are all of one unitary body preferably constructed of brass.

Prior to the present invention, ball valves were used exclusively for the sole purpose to provide in line water shutoff before the line reaches an end appliance, such as a faucet, hot water tank, toilet or other end line fixture.

The hose end lever control ball spigot valve of the present invention provides numerous advantages over the prior art spigots in that it is easy to open and close, even by a person having arthritic hands and does not have washers that commonly need to be replaced. Also, the valve lever is so positioned in a vertical plane such that one cannot hit his or her knuckles on adjacent wall surfaces when operating the valve. The lever handle is easy to grip and the valve opens and closes very quickly, yet the valve can still very effectively regulate infinite pressure control.

The volume of water is very simply controlled by turning the handle a quarter turn to open the spigot to maximum water supply discharge or by turning the lever only a fraction of a quarter turn to provide for a minimum flow of water out of the spigot into the garden hose. Because of its construction features the spigot of the present invention is also ideal for use with automatic washing machine water supply lines. If a washing machine hose should happen to burst, the valve can be positively and quickly actuated and the angle of the hose end connection places less stress on the hose being coupled to the faucet.

The lever spigot handle system of the present invention makes this spigot very easy for physically challenged individuals to operate. Also, a far broader spectrum of individuals will be able to use the new spigot valve of the present invention with its ease of operation and injury free design.

BRIEF DESCRIPTION OF THE DRAWINGS

Other objects and advantages appear hereinafter in the following description and claims. The accompanying drawings show, for the purpose of exemplification, without limiting the scope of the invention or the appended claims, certain practical embodiments of the present invention wherein:

FIG. 1 is a view in front elevation of the hose end lever controlled ball spigot valve of the present invention;

FIG. 2 is a right side view of the spigot valve shown in FIG. 1; and

DETAILED DESCRIPTION OF A PREFERRED EMBODIMENT

Figure 3:
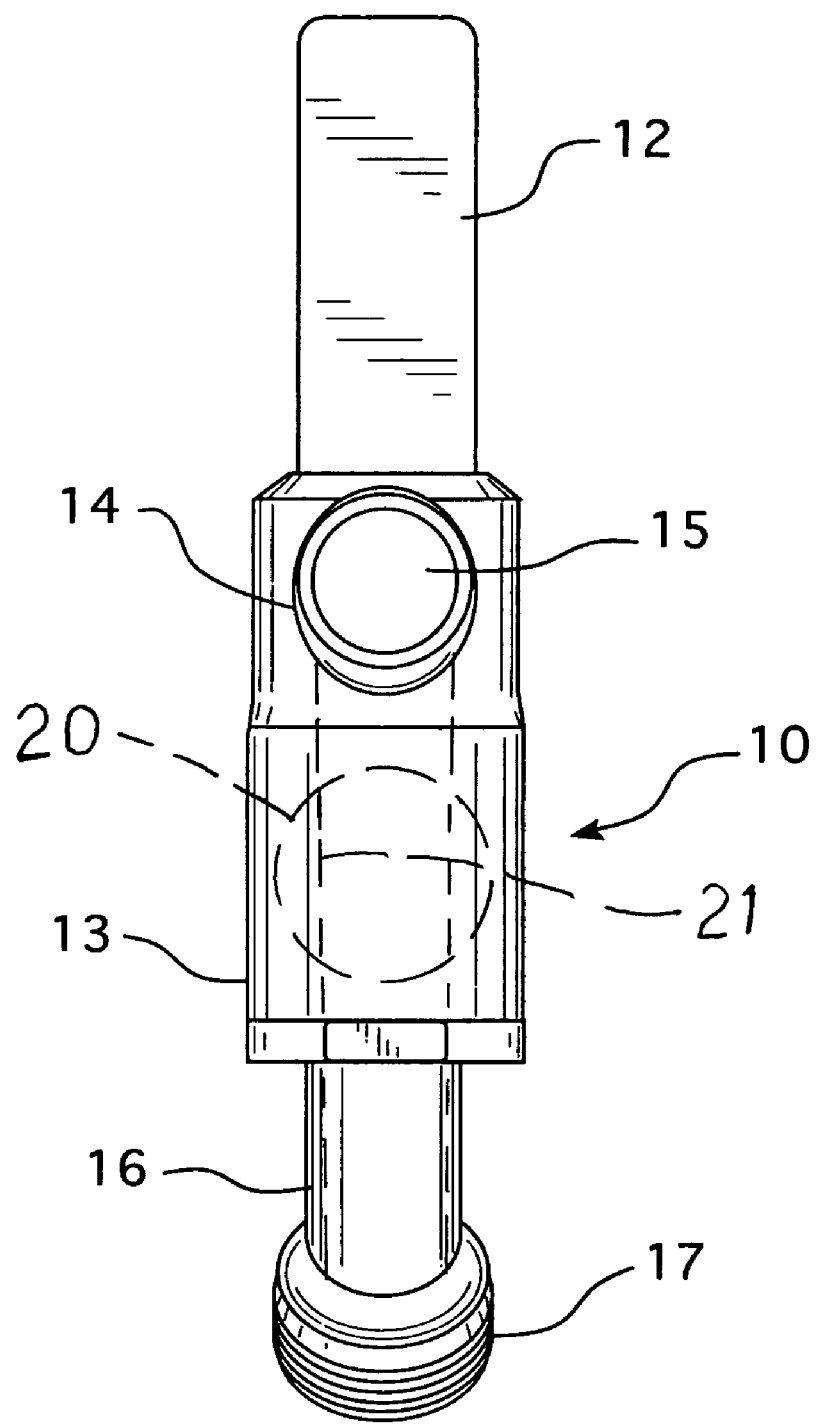
FIG. 3 is a rear view of the spigot valve shown in FIG. 1.

Referring to the figures, the hose and lever controlled ball spigot valve 10 of the present invention includes a quarter turn lever actuated ball valve 11 of conventional type having an actuating lever 12 and a ball valve body 20 and a housing 13. In the figures actuating lever 12 is shown in the open position and is in line with the water passage 21 through the ball valve 20 and housing 13. To turn the valve off the lever 12 is simply rotated clockwise 90° for full off. The valve housing inlet 14 is provided with a 90° bend which thereby provides a 90° inlet for the valve with the inlet 15 protruding 180° away from lever 12.

The outlet spout 16 is secured to the bottom of valve housing 13 at the valve outlet for thereby providing an outlet for the valve having a threaded male hose coupling 17 on the distal end of the spout 16. Outlet spout 16 extends at an approximate angle of 45° from the valve housing 13 toward the lever 12 thereby better exposing the hose coupling thread 17 for easy connection of a hose (not shown) and ultimately causing less stress to be provided on the hose portion which is adjacent the threaded male coupling 17.

The inlet 14 and valve body 13 are unitary body preferably constructed of brass. Spout 16 is also preferably constructed of brass and is secured to valve housing 13 by any appropriate means such as a threaded connection or preferably molded as one piece with housing 13.

I claim:

1. A hose end water spigot comprising:
   a quarter turn lever actuated ball valve having a valve housing with an inlet and an outlet and a ball valve actuating stem protruding from said housing and engaged at a right angle with said lever;
   said valve housing inlet having a 90° bend for thereby providing a 90° inlet for said valve with the inlet thereof protruding 180° away from the direction of protrusion of said valve actuating stem;
   an outlet spout secured to said valve housing at said valve outlet for thereby providing an outlet for said valve and having a threaded male hose coupling on a distal outlet end of said spout;
   said outlet spout extending at an approximate angle of 45° from said valve housing in the same direction as said valve actuating stem.

2. The hose end water spigot of claim 1, wherein said valve housing and said 90° inlet are a unitary body.

3. The hose end water spigot of claim 2, wherein said valve housing and spout are brass.

4. The hose end water spigot of claim 2, wherein said spout is unitary with said valve housing.

* * * * *